…

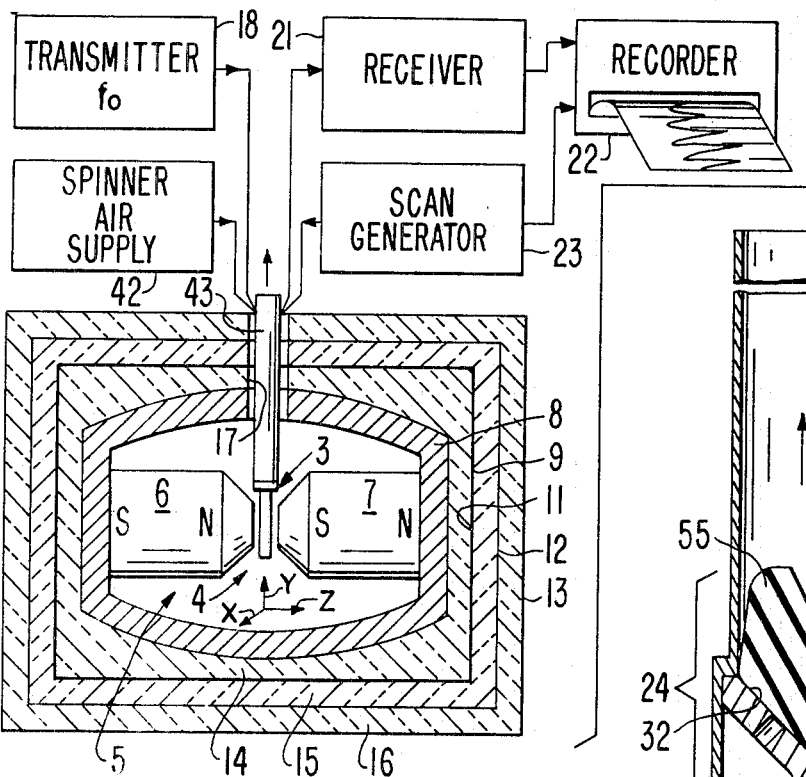
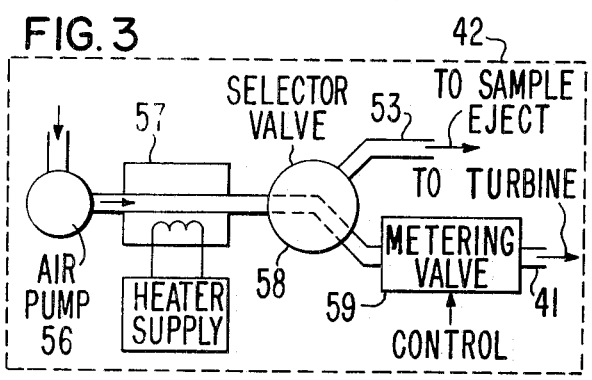
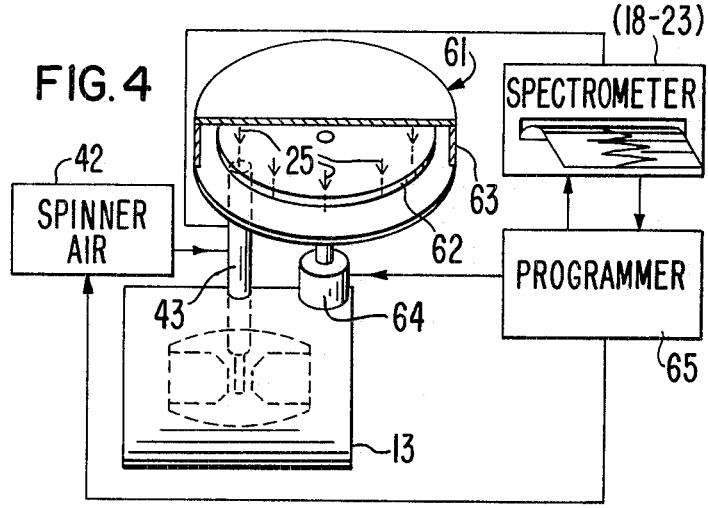
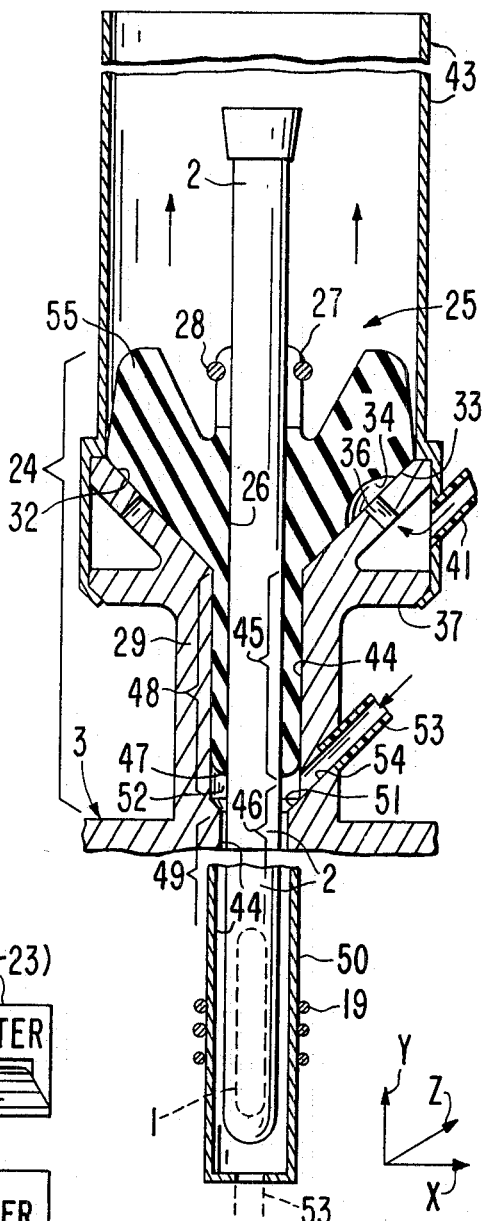
INVENTOR.
HUGH J. HALL
BY
ATTORNEY

United States Patent Office 3,512,078
Patented May 12, 1970

---

3,512,078
GYROMAGNETIC RESONANCE SPECTROMETER EMPLOYING AIR PRESSURE FOR EJECTING SAMPLES FROM THE MAGNET
Hugh J. Hall, Los Altos, Calif., assignor to Varian Associates, Palo Alto, Calif., a corporation of California
Filed June 12, 1967, Ser. No. 645,396
Int. Cl. G01n 27/78
U.S. Cl. 324—.5           9 Claims

ABSTRACT OF THE DISCLOSURE

A gyromagnetic resonance spectrometer is disclosed which employs an air driven turbine for spinning the sample and an air driven ejector for ejecting the sample from the magnet. Also, a flue portion of the ejector may be employed for loading samples in the sample spinner. In one embodiment of the present invention, an automatic sample loader is programmed to drop successive samples into the flue for successive analysis by the spectrometer and to retrieve the samples as successively ejected by the ejector after analysis by the spectrometer. Thus, numerous samples can be analyzed without the presence of an operator.

DESCRIPTION OF THE PRIOR ART

Heretofore, an air driven turbine has been employed for spinning samples in the gap of the magnet of a nuclear magnetic resonance spectrometer. Spinning the sample averages out certain residual magnetic field gradients in the polarizing magnetic field to narrow the resonance lines in the spectrum of the sample under analysis. Such an air turbine is described and claimed in U.S. Pat. 2,960,649 issued Nov. 15, 1960.

In the prior magnet system, open yoke structures were employed such that the operator could, with relative ease, reach his hand into the gap of the magnet for insertion and retrieval of the sample with its attached rotator portion of the air turbine.

However, with the advent of closed yoke permanent magnet structures wherein the gap is enclosed not only by the magnet yoke structure but by surrounding thermal and magnetic shields, access to the gap by the operator for changing samples becomes impractical.

SUMMARY OF THE PRESENT INVENTION

The principal object of the present invention is the provision of an improved gyromagnetic resonance spectrometer.

One feature of the present invention is the provision, in a gyromagnetic resonance spectrometer, of a gas driven ejector for ejecting the sample from the probe to facilitate removal of the sample from the magnet system.

Another feature of the present invention is the same as the preceding feature including the provision of a guide structure for guiding the sample into and out of the probe whereby insertion and withdrawal of the sample from the magnet system is facilitated.

Another feature of the present invention is the same as any one or more of the preceding features including the provision of a gas driven turbine for spinning the sample and wherein the rotor of the turbine is affixed to the sample, whereby the ejector ejects the sample and rotator from the stator portion of the turbine.

Another feature of the present invention is the same as the preceding feature wherein the guide structure guides the sample and rotator into and out of the turbine, whereby insertion and withdrawal of the sample and rotator from the stator portion of the turbine is facilitated.

Another feature of the present invention is the same as any one or more of the preceding features including the provision of a programmed loader and ejector for sequentially loading, analyzing, and retrieving a succession of samples, whereby spectral data is obtained from a number of samples without the presence of an operator.

Other features and advantages of the present invention will be apparent upon a perusal of the following specification taken in connection with the accompanying drawings wherein:

BRIEF DESCRIPTION OF THE DRAWINGS

FIG. 1 is a schematic diagram, partly in section and partly in block form, of a gyromagnetic resonance spectrometer incorporating features of the present invention, FIG. 2 is an enlarged fragmentary sectional view of a portion of the structure of FIG. 1 delineated by line 2—2 and turned 90°, FIG. 3 is a schematic diagram of a portion of the structure of FIG. 1 delineated by lines 3—3, and FIG. 4 is a schematic block diagram of a spectrometer system incorporating features of the present invention.

DESCRIPTION OF THE PREFERRED EMBODIMENTS

Referring now to FIGS. 1 and 2, there is shown a nuclear magnetic resonance spectrometer incorporating features of the present invention. A sample of matter 1 to be analyzed is disposed in a sample vial 2 within a probe housing 3 and immersed in a unidirectional polarizing magnetic field $H_0$ produced in the gap 4 of a permanent magnet 5.

The magnet 5 includes a pair of axially directed permanent magnets 6 and 7 with their adjacent ends spaced apart to form the gap 4. An egg-shaped magnetic yoke 8 as of soft iron, interconnects the far poles of the magnets 6 and 7 to form a flux return path around the magnets 6 and 7. In addition, the yoke structure 8 encloses the gap 4 for magnetically shielding the gap 4 from external magnetic effects.

Four hollow cylindrical metal enclosures as concentrically disposed around the yoke 8. They include an oven 9 and three magnetic shields 11, 12 and 13. Magnetic shields 11 and 12 are made of $\mu$-metal and the outermost shield 13 is made of iron. The inner shield 11 is disposed adjacent the inside surface of the oven 9. Three thermally insulative foam jackets 14, 15 and 16 are concentrically disposed surrounding the magnet yoke 8. An insulative thermal jacket is disposed between each of the adjacent magnetic shields. The innermost jacket 14 is disposed between the yoke 8 and the first shield 11. The foam jackets thermally lag the magnet system and the oven 9 maintains the magnet 5 at a constant temperature of 36° C.±0.001° C. for stabilizing the polarizing field $H_0$ at a high intensity, as of 14.5 kg. An access bore 17 in the yoke 8 and enclosing structures is provided for inserting the probe 3 into the gap 4.

A radio frequency transmitter 18 supplies RF energy to a tuned coil 19 in the probe 3 adjacent the sample 1. The transmitter energy which is applied to the coil 19 serves to irradiate the sample with a radio frequency magnetic field to produce nuclear resonance of the sample 1. Resonance signals emanating from the sample 1 are picked up in the coil 19 and fed to a radio frequency receiver 21 wherein they are amplified and detected to produce an output resonance signal. The resonance signal is fed to one input of a recorder 22 and recorded versus a scan signal derived from scan generator 23 to produce a recorded output spectrum. The scan generator 23 serves to scan the polarizing magnetic field intensity in the sample 1 through the various resonance lines of the sample 1.

In spite of the great care exercised in fabrication of the probe 3 and magnet 5, certain minute residual gradients of the polarizing magnetic field exist in the sample 1. These residual gradients are on the order of 0.1 milligauss per centimeter and serve to broaden the resonance lines of the sample 1. Certain of these gradients in the X and Z direction are averaged out by spinning the sample 1 about the Y axis at a suitable rate of sample rotation such as, for example, between 25 and 40 revolutions per second (r.p.s.). The result of the sample spinning is to narrow the resonance lines of the sample spectrum.

An air driven turbine 24 is conventionally employed to spin the sample 1. The air turbine 24 includes an elongated rotator 25 made of a non-magnetic, non-conductive material such as Delrin plastic, a product of Du Pont. The rotator 25 includes an axial bore 26 which receives the tubular glass sample vial 2 therein forming a sample container portion of the rotator structure 25. The upper end of the rotator 25 is axially slotted to form a plurality of axial fingers 27. An elastic O-ring 28 is placed around the fingers 27 to pull the fingers 27 against the vial 2, thereby gripping the vial 2 for rotation thereof.

A stator portion 29 of the air turbine 24 is formed by an upstanding neck portion of the aluminum probe housing 3. The stator portion 29 includes a frusto-conical bearing surface 32 formed in the upper end of the neck portion 29 to mate with a frusto-conical bearing surface 33 of the rotator 25. A plurality of air buckets 34 are formed about the circumference of the rotator bearing surface 33 to catch air circumferentially directed at the buckets 34 through air passageways 36 communicating with an air distribution manifold 37 formed in and extending around the stator 29.

Air which is preheated to the magnet temperature and supplied at a flow rate of between 0.3 and 0.5 cubic foot per minute is fed into the manifold 37 via a thermally insulative plastic tubing 41 from a spinner air supply 42. The air courses around the rotator 25 rotating same and exhausts out a tubular flue 43 which is made of a thermally conductive material such as aluminum, inside the yoke structure 8 and of a thermally insulative material for its length outside the yoke 8. The air serves not only to spin the rotator 25 and sample 1 but also serves as a lubricant between the bearing surfaces 32 and 33 of the stator and rotator, respectively.

An air driven ejector is also built into the air turbine 24 for ejecting the rotator 25 with its contained sample 1 from the magnet system by driving the rotator up the flue 43. More specifically, the rotator 25 includes an elongated dependent cylindrical portion which is axially disposed of a cylindrical bore 44 in the stator 29. The rotator 25 has a first section 45, of its axial length having a first outside diameter and a second section 46 of its length having a lesser outside diameter, thereby forming an outside shoulder 47 at the junction of sections 45 and 46. The stator bore 44 has a first section 48 of its length of a first inside diameter and a second section 49 of its length having a lesser inside diameter. An inside shoulder 51 is formed at the junction of sections 48 and 49. An annular chamber 52 is defined by the axial space between the shoulder 47 and 48 on the rotator 25 and stator bore 44 respectively. In addition, the lower extension of the bore 44 formed by the inside wall of a glass coil form 50 for the coil 19, is closed at its end to form a closed chamber with chamber 52. An air inlet pipe 53 connects into the annular chamber 52 via a gas passageway 54 in the stator 29.

To eject the rotator 25 and sample 1, air is fed from the spinner air supply 42 via inlet pipe 53 into the annular chamber 52 for pressurizing same together with the lower end of the closed bore 44. The air pressure produces an axially directed force on the rotator 25 which is sufficient to break the Venturi effect forces holding the rotator 25 in seated relation with the stator bearing surface 32 and to drive the rotator 25 and dependent sample 1 up the flue 43 and out of the magnet system.

A rotator 25 with its dependent sample 1 is loaded into the turbine 24 by dropping the rotator 25, as affixed to the vial portion 2, down the flue 43 with the spinner air being fed to the spinner manifold 37. The inside walls of the flue 43 engages the outer periphery of the rotator, at its wing portions 55, and serve to guide the rotator 25 into seated relation with the stator 29.

Referring now to FIG. 3, there is shown the spinner air supply system. Filtered air is taken into a pump 56 and pumped through a heat exchanger 57 wherein the air is heated to the temperature of the oven heated magnet 5. The heated air is fed to a selective valve 58. One output of the selector valve is fed via a metering valve 59 to the spinner air distribution manifold 37 via tube 41. The other output of the selector valve 58, which may be selected by rotation of the selector valve control, directs the air to the ejection chamber 52 via tube 53.

Referring now to FIG. 4, there is shown a spectrometer of the present invention together with an automatic sample loading and retrieving apparatus such that a number of samples can be analyzed without the presence of an operator. The apparatus is essentially the same as previously described with regard to FIGS. 1–3 with the addition of a programmer and a sample loader. More specifically, a sample loader 61 is mounted over the magnet system. The sample loader 61 includes a turntable 62 (shown broken away and in perspective) having a plurality of receptacles spaced apart about the circumference of the table 62. Rotator 25, including their sample loaded vials 2, are placed in the receptacles. An oven 63 covers the rotator 25 for preheating the samples and rotators 25 to the temperature of the magnet 5. A motor 64 drives the turntable 62.

A programmer 65 is programmed to operate the spectrometer (18–23) and the sample loading apparatus 61. The programmer 65 sends a signal to the motor 64 to rotate the turntable 62 until a sample loaded rotator 25 is positioned over the open end of the flue 43. The programmer 65 stops the motor 64 and turntable 62 in this position. The programmer 65 sends a signal to the turntable to open the receptacle and drop the sample loaded rotator 25 into the open end of the flue 43. The rotator drops into position in the stator 29 and is spun at a predetermined rate, as of 35 r.p.s. The programmer 65 then signals to the spectrometer to run a spectrum of the sample. After the spectrum is obtained, the spectrometer (18–23) sends a signal to the programmer 65 which in turn actuates the selector valve 58 to eject the rotator 25 and sample 1. The rotator 25 is driven up the flue 43 into the open receptacle. The programmer 65 then closes the receptacle and starts a new operating cycle for analysis of the next sample. The advantage of the automatic spectrometer system of FIG. 4 is that an operator can load numerous samples into the loader 61 for analysis without having to attend the machine for changing samples, etc.

Although the air driven sample ejector has been shown and described as employed in a gas driven turbine, the turbine can be eliminated and the air driven ejector and flue 43 employed for insertion and withdrawal of the sample from the probe structure 3. In such a system, the structure is essentially identical to that shown except that the flue 43 would have an inside diameter only large enough to accommodate the sample vial 2. The ejector air would be applied through a gas passageway communicating through the bottom closed end of the coil form 50, as indicated by dotted lines 53. The ejector and flue may also be employed for insertion and withdrawal of electron spin resonance (ESR) samples from cavity probe structures of ESR gyromagnetic resonance spectrometers. Also, the sample ejector need not employ positive air pressure in ejector chamber 52. Alternatively, a negative air pressure (suction) may be applied to the upper end of the flue 43 to produce the pressure differential across the sample container structure and rotator to push same up the flue 43.

What is claimed is:

1. In a gyromagnetic resonance spectrometer apparatus, means forming a probe structure for holding a sample of matter to be investigated in a unidirectional polarizing magnetic field, means forming a movable sample container structure for containing the sample within said probe structure, means for exciting and detecting gyromagnetic resonance of the sample as immersed in the polarizing magnetic field, the improvement comprising, means for selectively ejecting said movable sample container from said probe structure, said ejecting means including a fluid passageway within said probe structure, and wherein said sample container structure is slidable within said fluid passageway, and wherein said ejector means produces a fluid pressure differential across said movable container structure to slidably move said container relative to said probe structure.

2. The apparatus of claim 1 including means forming a guiding structure axially aligned with said fluid passageway and extending away from said probe structure, said guiding structure engaging said movable sample container structure to guide passage of said container therealong to and from said probe structure.

3. The apparatus of claim 1 including, means forming a gas driven turbine having a rotator structure and a stator structure for spinning the sample in the polarizing magnetic field to average out certain magnetic field gradients in the polarizing magnetic field for narrowing the resonance lines of the sample, said movable sample containing structure including said rotator structure as a portion thereof and said rotator being axially disposed of and seated within said stator structure when spinning the sample, and said sample container ejector means producing an axially directed force on said sample containing structure to axially eject said containing structure from said stator structure.

4. The apparatus of claim 3, including means forming a guiding structure axially aligned with said stator structure and extending away from said stator, said guiding structure including means for engaging and for guiding passage of said rotator therealong to and from said stator structure.

5. The apparatus of claim 3, including means forming a tubular structure axially aligned with said stator structure and extending away from said stator, said tubular structure serving as a passageway to and from said stator for said movable sample container structure, said tubular structure also slidably engaging said rotator structure to guide said rotator into said stator.

6. The apparatus of claim 5 wherein said tubular structure comprises a flue for the escape of exhaust gas from said turbine, and wherein said ejector means ejects said rotator into said flue to be carried along said flue by the axially directed flow of gas injected into said flue by said ejector means.

7. The apparatus of claim 3 wherein said sample container structure includes an elongated cylindrical portion, and wherein said stator includes an elongated cylindrical bore to receive said cylindrical portion of said container structure therein, said cylindrical portion of said container structure having a first length of a first outside diameter and a second length of a lesser outside diameter to form an external shoulder on said container structure at the junction of its first and second lengths, said bore in said stator having a first length of a first inside diameter and a second length of a lesser diameter to form an internal shoulder at the junction of its first and second lengths, said external and internal shoulders being axially spaced apart to define an annular chamber therebetween when said sample container structure is seated within said stator, and wherein said container ejector means includes a gas passageway communicating with said annular chamber, whereby gas injected into said annular chamber causes said sample container structure to be axially ejected from said stator by expanding the axial lenegth of said annular chamber.

8. The apparatus of claim 2 including, a permanent magnet means for producing the unidirectional polarizing magnetic field in the sample, said permanent magnet including a pair of axially-directed permanent magnets with their adjacent ends spaced apart to define a magnetic gap in which the sample is immersed, and means forming an apertured magnetic yoke structure interconnecting the far ends of said permanent magnets, said yoke enclosing said permanent magnets and the gap for shielding the gap from external magnetic effects and for providing a magnetic flux return path around said magnets, and said guiding structure passing radially toward the gap through the aperture in said yoke structure.

9. The apparatus of claim 1 including: loading means operable to sequentially load successive ones of a plurality of sample container structures, each containing a sample, into said probe structure; spectrometer means operable to scan through resonance of said sample and to obtain resonance spectral data thereon; and programmer means to cause said loading means, said spectrometer means, and said ejecting means to operate in a sequence such that each of said sample container structures is loaded into said probe structure, said resonant spectral data is obtained, and said sample container structure is ejected.

References Cited

UNITED STATES PATENTS 3,394,300   7/1968   Packard _____ 324—.5

RUDOLPH V. ROLINEC, Primary Examiner

M. J. LYNCH, Assistant Examiner